(12) United States Patent
Wu et al.

(10) Patent No.: US 12,504,943 B1
(45) Date of Patent: Dec. 23, 2025

(54) MULTI-APPLICATION AUDIO SPLICING

(71) Applicant: Meta Platforms, Inc., Menlo Park, CA (US)

(72) Inventors: Samuel Wu, New York, NY (US); Alonso Fernandez Baptista, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 254 days.

(21) Appl. No.: 18/047,709

(22) Filed: Oct. 19, 2022

(51) Int. Cl.
*G06F 3/16* (2006.01)
*G06F 9/54* (2006.01)
*H04L 67/53* (2022.01)

(52) U.S. Cl.
CPC ............... *G06F 3/165* (2013.01); *G06F 9/54* (2013.01); *H04L 67/53* (2022.05)

(58) Field of Classification Search
CPC ............ G06F 3/165; G06F 9/54; H04L 67/53
See application file for complete search history.

(56) References Cited

U.S. PATENT DOCUMENTS 9,583,142 B1 * 2/2017 Zhu .................... H04N 21/8173
2015/0205492 A1 * 7/2015 Nobil .................... G06F 16/438
715/716
2017/0236551 A1 * 8/2017 Leiberman ............. G11B 27/28
386/285
2018/0024724 A1   1/2018 Patel et al.
2021/0064327 A1 * 3/2021 Ispahani ............... G06F 3/0484

OTHER PUBLICATIONS

European Search Report for European Patent Application No. 23194708.6, dated Feb. 12, 2024, 5 pages.

* cited by examiner

*Primary Examiner* — Joseph Saunders, Jr.
(74) *Attorney, Agent, or Firm* — EVERSHEDS SUTHERLAND (US) LLP

(57) ABSTRACT

Systems and methods for multi-application audio splicing may include (1) receiving, from a third-party application installed on a user's device, an audio segment of an audio file selected by the user via an audio-segment-selection interface presented by the third-party application in association with the audio file, (2) loading the audio segment into a post-creation interface of a social media application installed on the user's device and prompting the user to add visual content via the post-creation interface, (3) creating a social media post that includes (i) the audio segment and (ii) visual content added by the user via the post-creation interface, and (4) posting the social media post to a social media consumption channel. Various other methods, systems, and computer-readable media are also disclosed.

20 Claims, 7 Drawing Sheets

MULTI-APPLICATION AUDIO SPLICING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
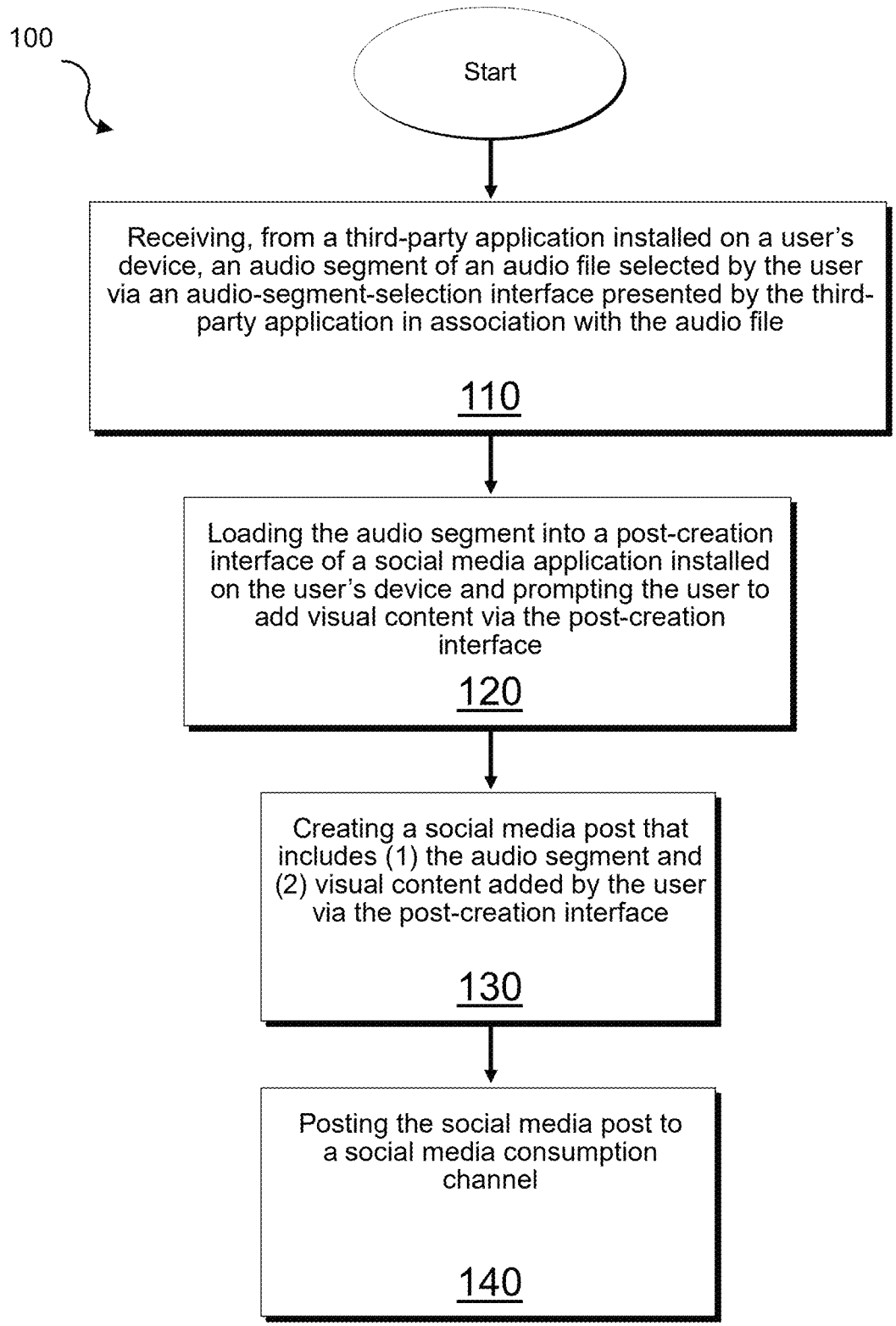
FIG. 1 is a flow diagram of an exemplary method for transferring audio segments via an application programming interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a system for transferring audio segments across applications (e.g., from an audio-consumption application to a social networking application to be spliced into a social media composition). In some examples, a social networking platform may provide a third-party application (e.g., an audio consumption application) with a sharing entry point (e.g., an audio-transfer Application Programming Interface (API)) through which audio segments may be shared with a social networking application. While a user is listening to an audio file (e.g., a podcast) via the third-party application, the third-party application may display an audio file interface, corresponding to the audio file, as the audio file is played. The audio file interface may enable the user to (1) select an audio segment of the audio file and (2) share the audio segment with the social networking application.

In response to receiving user input to the audio file interface selecting to share an audio segment with the social networking application, the third-party application may transfer the audio segment to the social networking application via the sharing entry point provided by the social networking platform. Upon receiving the audio segment (e.g., via the sharing entry point), the social networking application may splice the content into a user content (e.g., video) editing flow (e.g., in which the user creates original visual content to combine with the imported audio content). In additional or alternative examples, the social networking application may bring the audio segment into a virtual reality creation flow.

As will be explained in greater detail below, embodiments of the present disclosure may improve the field of digital social networking by improving a framework for importing audio to a digital content creation flow. The present disclosure may improve the functioning of a computer itself by enabling cross-application audio sharing.

The following will provide, with reference to FIG. 1, detailed descriptions of computer-implemented methods for transferring audio segments across applications. Detailed descriptions of corresponding example systems will also be provided in connection with FIG. 2. Detailed descriptions of interfaces and embodiments corresponding to the disclosed methods and systems will be provided in connection with FIGS. 3-7.

FIG. 1 is a flow diagram of an exemplary computer-implemented method 100 for transferring audio segments across applications. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (associated with a user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a social networking platform (e.g., between user 206 of user device 204 and a user 210 of an additional user device 208) via an interface of the social networking platform. Examples of social networking may include, without limitation, text-based and/or image-based communication, video-based communication, audio-based videoconferencing and/or audioconferencing, digital status broadcasting, private digital messaging, public content posting and/or commenting via a social media feed and/or a profile, etc. In some examples, server 202 may operate as part of and/or in connection with a social media service 212. Although illustrated as a single entity in FIG. 2, server 202 may include and/or represent a group of multiple servers that operate in conjunction with one another.

User device 204 and additional user device 208 generally represent any type or form of computing device capable of reading computer-executable instructions. For example, user device 204 and/or additional user device 208 may represent a smart phone and/or a tablet. Additional examples of user device 204 and/or additional user device 208 may include, without limitation, a laptop, a desktop, a wearable device, a personal digital assistant (PDA), etc.

In some examples, users 206 and 210 of user devices 204 and 208 may be users (e.g., members) of a social networking platform (e.g., social media service 212). In these examples, user devices 204 and 208 may each have installed an instance of a social media application 214, which may operate as part of social media service 212 and through which one or more services provided by social media service 212 (e.g., via server 202) may be accessible. In some examples, social media application 214 may be dedicated to a single service. For example, social media application 214 may represent a dedicated newsfeed application or a dedicated stories application. In other examples, social media application 214 may provide access to multiple services (e.g., a combination of the digital newsfeed service, digital story service, digital messaging service, and/or digital short-form video service described below). In addition, or as an alternative, to social media application 214, user devices 204 and/or 208 may have installed a browser that may navigate to one or more webpages through which the one or more services provided by social media service 212 (e.g., via server 202) may also be accessible.

As mentioned above, social media service 212 may provide a variety of services (e.g., platforms and/or frameworks) for the users within its network (e.g., via server 202 and/or social media application 214). For example, social media service 212 may provide a newsfeed service. The term "newsfeed" may generally refer to any type or form of social media consumption channel, provided via an interface, that presents a scrollable collection of newsfeed posts. In some examples, a newsfeed may scroll (e.g., upward or downward) to reveal the different posts within the newsfeed (e.g., in response to receiving user scrolling input). In one example, the scrollable collection may include newsfeed posts created by contacts of a particular user (e.g., friends of the particular user) and/or other users that the particular user is following (i.e., connected content). Additionally, the newsfeed may include non-connected content (e.g., content created by users who are not contacts of the particular user).

Figure 3:
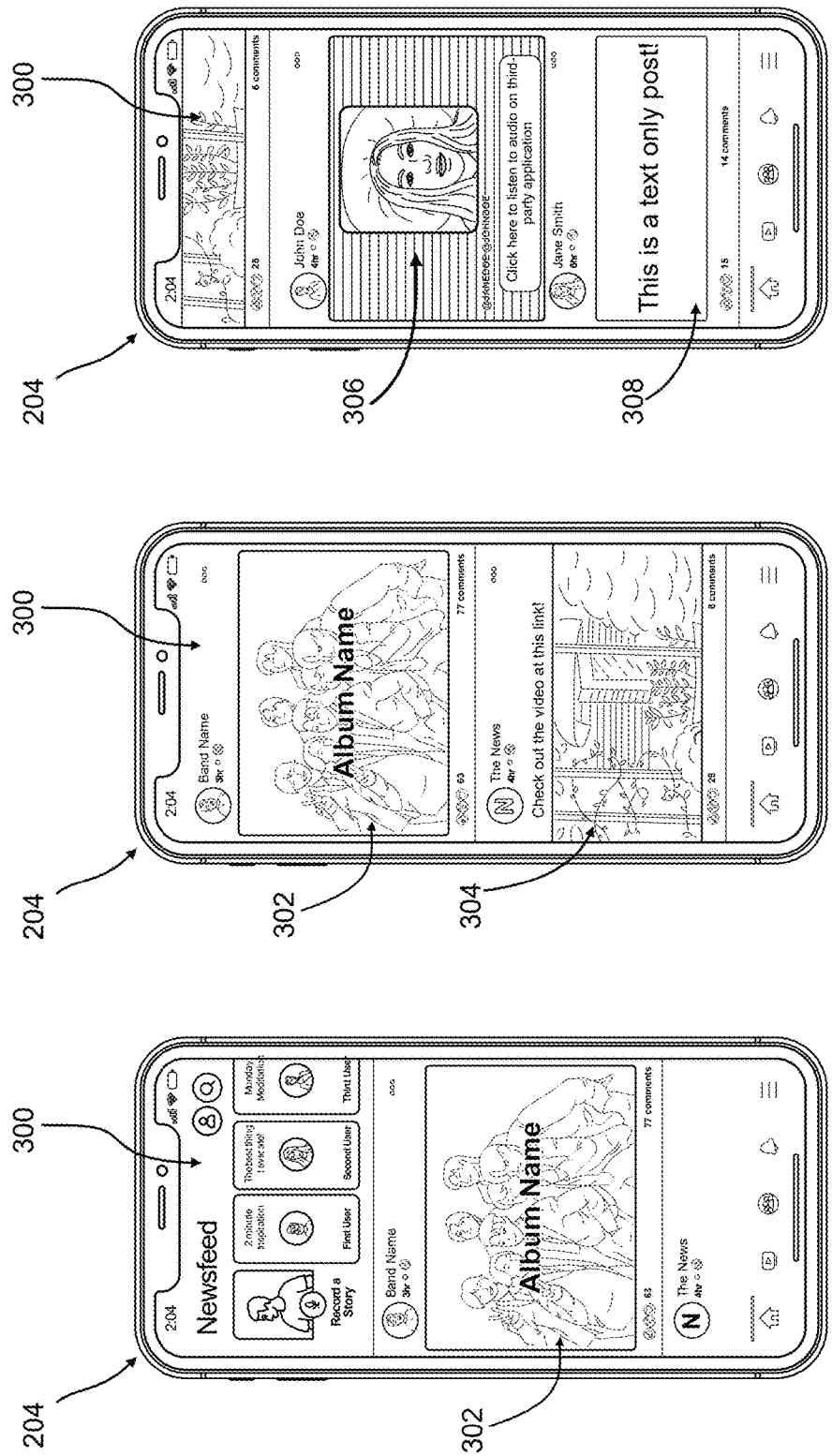
FIG. 3 is an illustration of an exemplary newsfeed interface.

The term "newsfeed post" generally refers to any type or form of digital composition that may be displayed in a newsfeed. Newsfeed posts may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes a combination newsfeed post 302 with an image and text, a link-based newsfeed post 304, a video-based newsfeed post 306, and a text-based newsfeed post 308. The video-based newsfeed post 306 depicted in FIG. 3 represents a video created via the audio segment sharing process that will be described below in connection with steps 110-140.

In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed (and/or a menu corresponding to such information and/or features may be displayed) within the viewing pane (e.g., over the primary content), above the viewing pane, beneath the viewing pane, to the side of the viewing pane, and/or may be otherwise visually associated with the newsfeed post.

The newsfeed service may enable viewers of a newsfeed post to digitally respond to the newsfeed post in a variety of ways. In some examples, a newsfeed interface may enable a user to comment on a newsfeed post (e.g., via a text, image, and/or video-based reply) and may create a digital thread of comments corresponding to the newsfeed post (e.g., displayed beneath the newsfeed post and/or accessible via a comments affordance).

As another example, social media service 212 may provide a digital stories service. The digital stories service may provide users with a story consumption channel (e.g., a digital stories feed), which presents a continuous series of digital story posts to a story-consumer, one by one (e.g., in a slideshow format). The term "digital story post" may generally refer to any type or form of social media post intended for a story consumption channel. A digital story composition may include a variety of content (e.g., a digital photograph, a graphic, text, a digital video, an artificial reality element, a digital audio recording, etc.). In one example, the story consumption channel may transition from presenting one digital story post to the next automatically, without requiring any user input to do so. In some examples, digital story posts from the same source (e.g., created and/or posted by the same user) may be grouped together within the story consumption channel, such that each digital story post from a particular source is displayed prior to displaying digital story posts from another source.

In one embodiment, a digital story post may be ephemeral. That is, the digital story post may only be viewable for a predetermined amount of time. For example, a digital story composition may be set to disappear after twenty-four hours. Similar to the newsfeed service, the digital stories service may enable viewers of a story post to comment on the post, via a text and/or image-based reply and/or reply story, creating a digital thread of comments. Also similar to the newsfeed service, the digital stories service may configure a story feed for a particular user that includes connected content (e.g., story posts created by users who are contacts of the particular user or being followed by the particular user), non-connected content, or a determined ratio of connected content to non-connected content.

Figure 4:
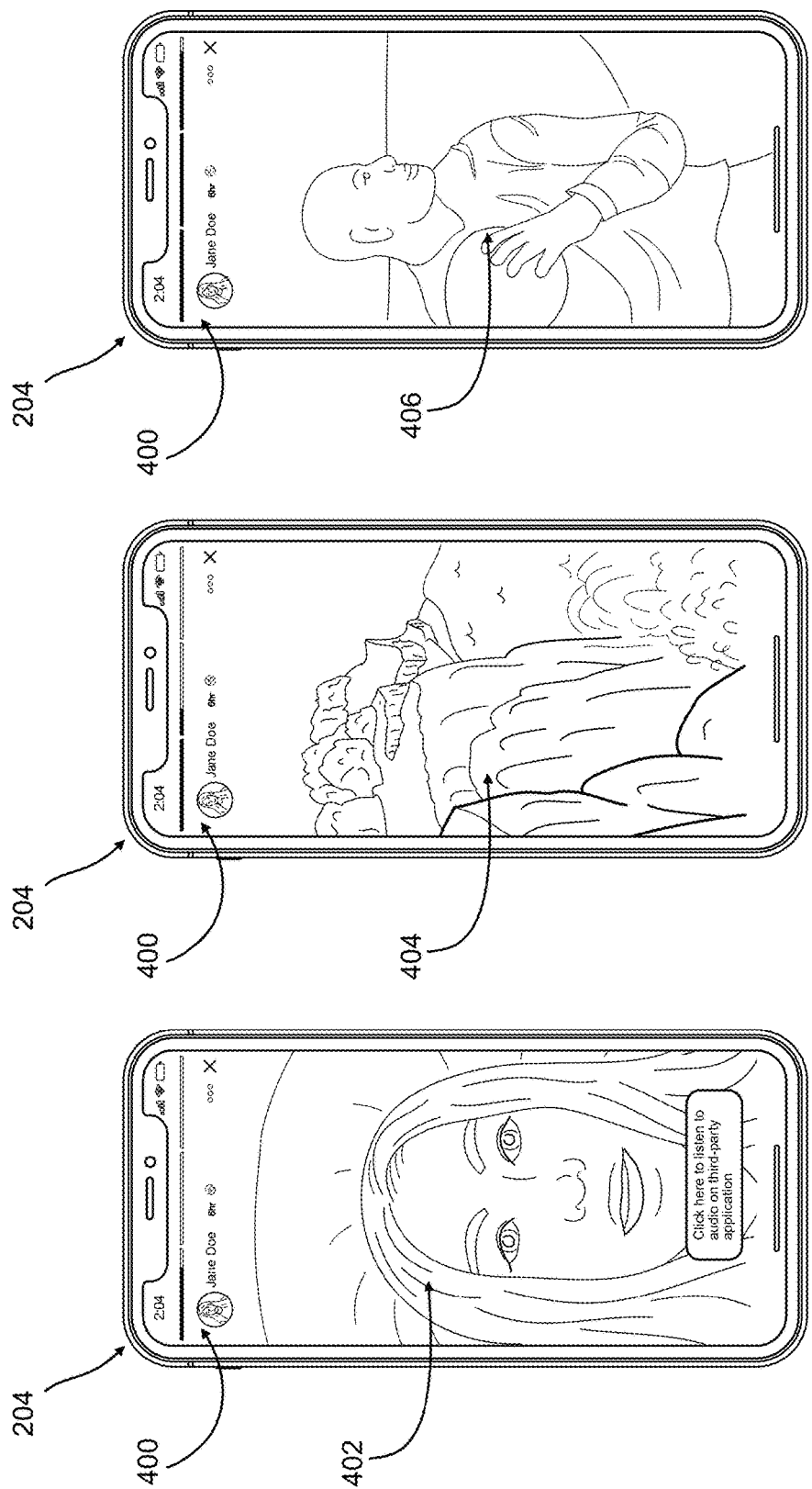
FIG. 4 is an illustration of an additional exemplary story interface.

FIG. 4 depicts an exemplary story interface 400 showing digital story posts 402, 404, and 406 of a user's digital story. Digital story post 402 shows a video post created via the audio segment sharing process that will be described below in connection with steps 110-140.

Figure 5:
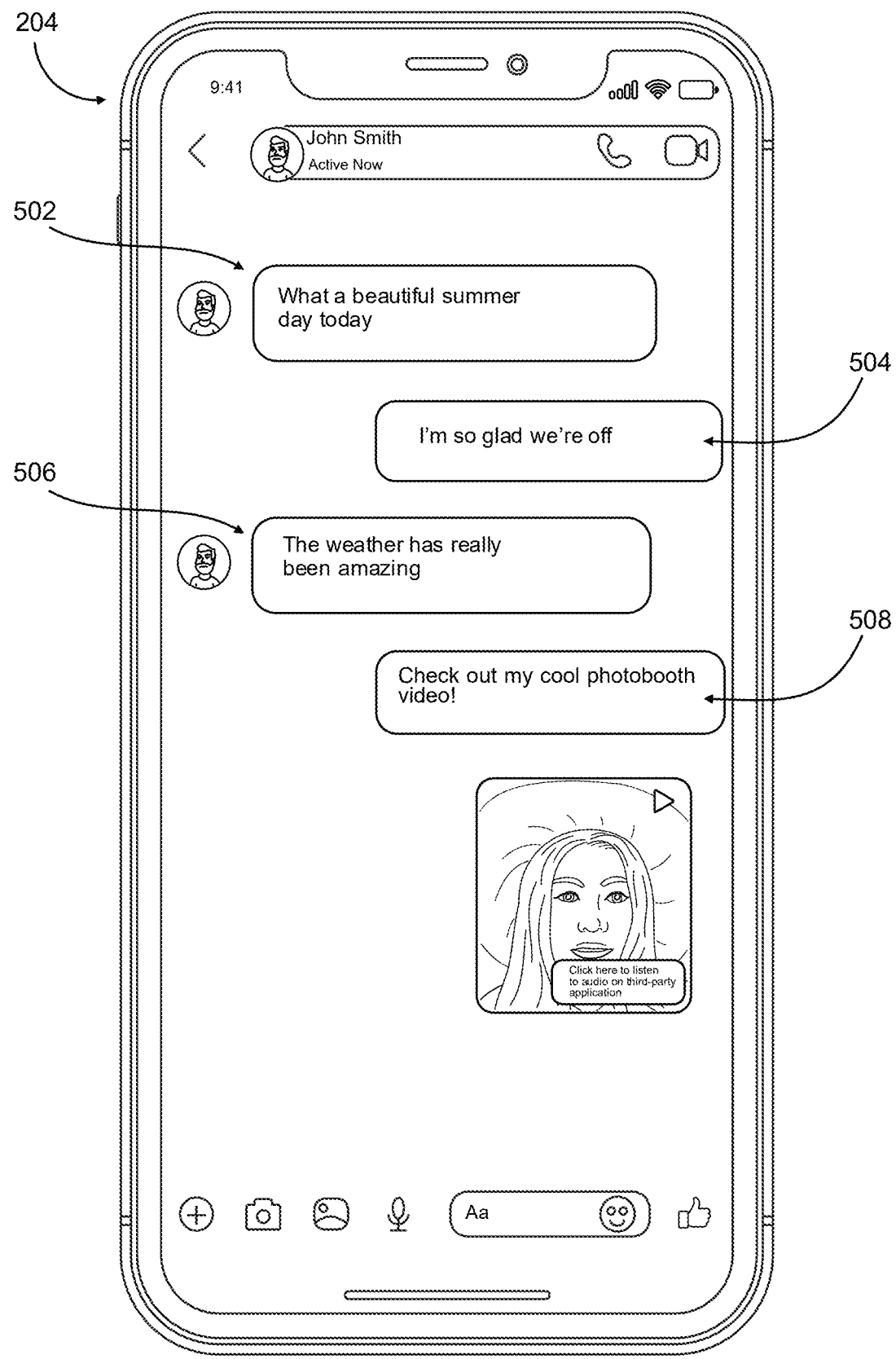
FIG. 5 is an illustration of an exemplary messaging interface.

As another example, social media service 212 may provide a messaging service. The term "messaging service" may generally refer to any type or form of digital message delivery system that enables users of social media service 212 to exchange messages (e.g., text messages, audio messages, and/or video messages). FIG. 5 depicts an exemplary messaging interface 500 showing digital message posts 502, 504, 506, and 508 of a digital messaging thread. Message post 508 includes a video-based social media composition created via the audio segment sharing process that will be described below in connection with steps 110-140.

In some examples, social media service 212 may provide a short-form video service (e.g., a reels service) that enables users to create short-form videos and/or consume (e.g., watch and/or digitally respond to) short-form videos created by other users. In one embodiment, social media service 212 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., less than thirty seconds in length).

The term "short-form video feed" may generally refer to a series (e.g., a queue) of digital short-form videos (e.g., selected for a particular user) that social media application 214 (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In one embodiment, the short-form video feed may only be configured to play pre-recorded short-form videos. Additionally or alternatively, a short-form video feed may be configured to play live short-form videos. In some examples, short-form videos may be continuously added to a user's short-form video feed as the short-form videos of the feed are consumed (e.g., such that a determined number of short-form videos are always in queue to be played).

Figure 6:
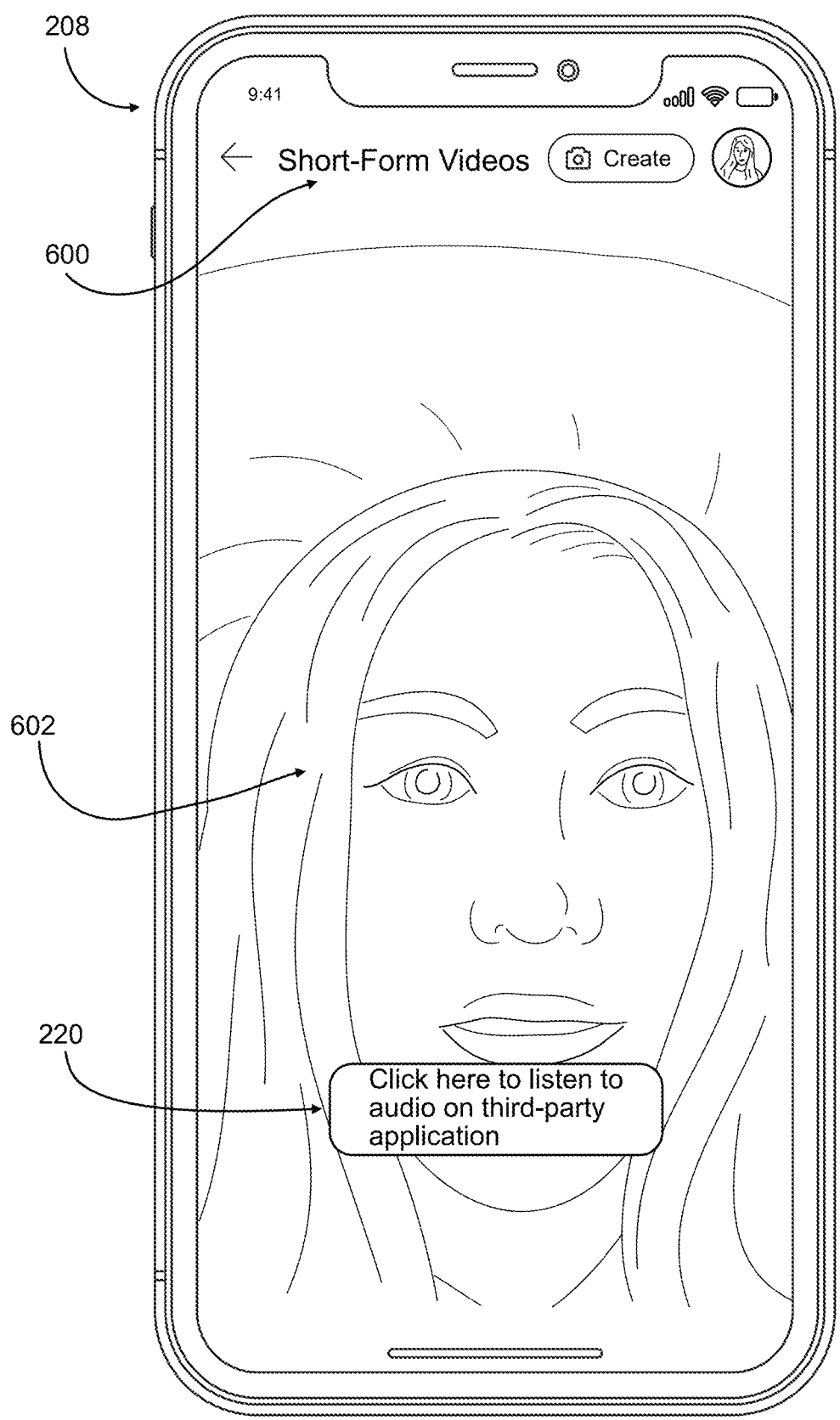
FIG. 6 is an illustration of an exemplary short-form video consumption interface.

In some examples, a short-form video feed may be presented via a dedicated short-form video feed interface. FIG. 6 depicts an exemplary dedicated short-form video feed interface 600 presenting a short-form video. The short-form video depicted in FIG. 6 presents a short-form video created via the audio segment sharing process that will be described below in connection with steps 110-140.

Short-form videos may be selected for the short-form video feed of a particular user based on a variety of metrics. For example, a short-form video may be selected based on a topic the short-form video has been tagged with (e.g., in response to a determination that the particular user is interested in and/or predicted to be interested in the topic). As another example, a short-form video may be selected based on a user who created the short-form video (e.g., in response to a determination that the particular user is following the user and/or is predicted to be interested in content by the creator). As another example, a short-form video may be selected based on a popularity of the short-form video.

In some examples, a short-form video feed may be thought of (e.g., configured) as a framework that exclusively and/or primarily provides users with non-connected content and/or that provides a user with a combination (of non-connected content and content created by content-creators that the user is following and/or connected to) that favors non-connected content (e.g., more non-connected content is included than connected content). In contrast, a newsfeed and/or stories feed may be thought of (e.g., configured) as a framework that primarily provides its users with connected content or that provides users with a combination (of connected and non-connected content) that favors connected content (e.g., more connected content is included than non-connected content).

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

Figure 2:
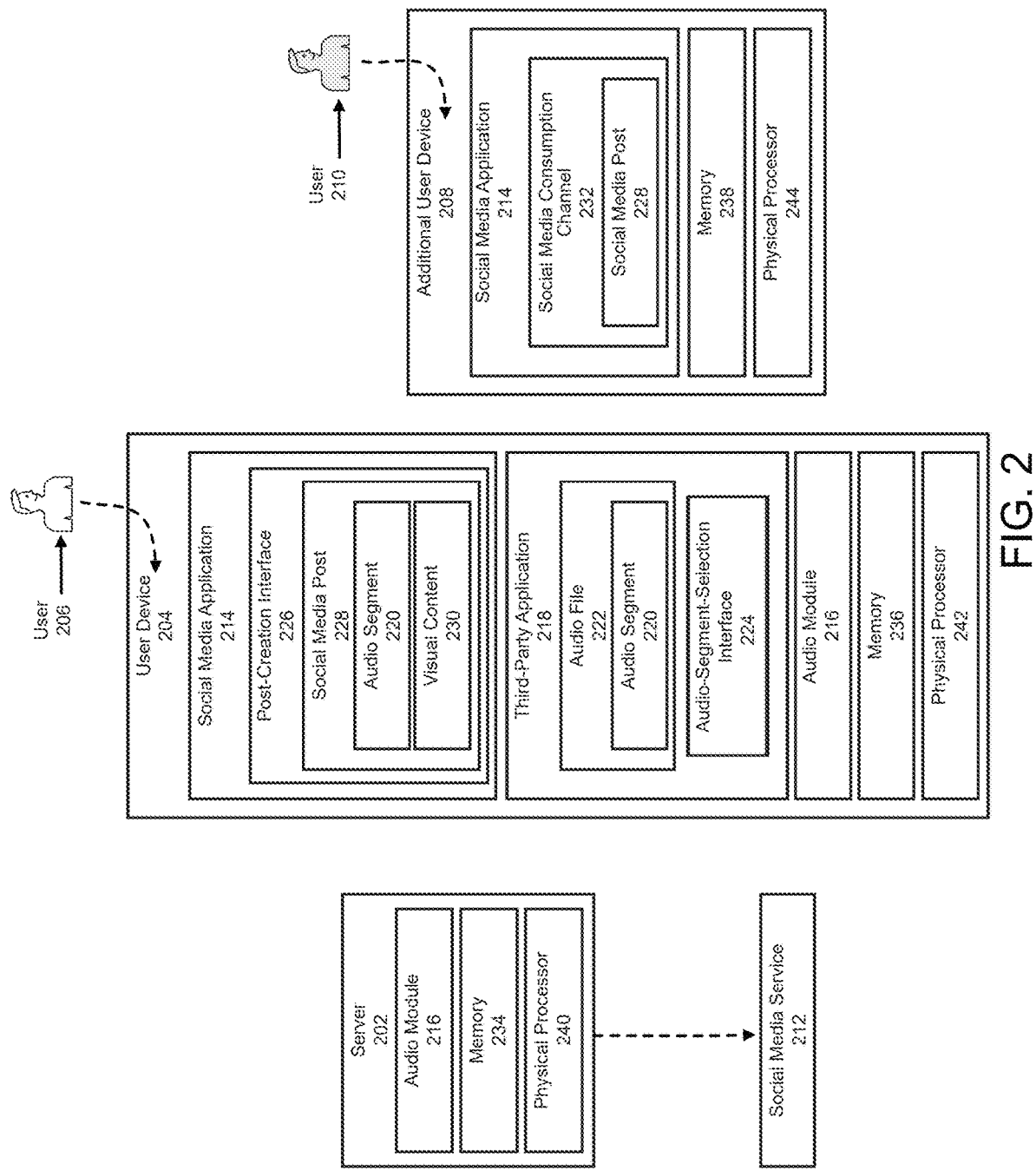
FIG. 2 is a block diagram of an exemplary system for transferring audio segments via an application programming interface.

Returning to FIG. 1, at step 110, one or more of the systems described herein may receive, from a third-party application installed on a user's device, an audio segment of an audio file selected by the user via an audio-segment-selection interface presented by the third-party application in association with the audio file. For example, as illustrated in FIG. 2, an audio module 216 may receive, from a third-party application 218 installed on user device 204, an audio segment 220 of an audio file 222 selected by user 206 via an audio-segment-selection interface 224 presented by third-party application 218 in association with audio file 222.

Third-party application 218 may represent any type or form of application installed and/or running on a user device that provides users with audio content (e.g., an audio consumption application that provides access to a database of audio files and/or that enables audio streaming). In some examples, third-party application 218 may represent a podcast application and audio file 222 may represent an audio file of a podcast. As another example, third-party application 218 may represent an audiobook application and audio file 222 may represent an audio file of an audiobook and/or of a chapter of an audiobook. As another example, third-party application 218 may represent a music application and audio file 222 may represent an audio file of a musical composition (e.g., a song). As another example, third-party application 218 may represent an interview-streaming application and audio file 222 may represent an audio file of a recorded interview.

In some examples, audio module 216 may operate as part of social media application 214 and may receive audio segment 220 from third-party application 218 via a cross-application sharing functionality provided and/or maintained by social media service 212. Social media service 212 may provide a cross-application sharing functionality (e.g., to third-party application 218 and/or social media application 214) in a variety of ways. For example, prior to audio module 216 receiving audio segment 220, social media service 212 may provide third-party application 218 and/or social media application 214 with an API (e.g., via server 202) that enables (1) user 206 to select audio segments via third-party application 218, (2) third-party application 218 to share audio segments with social media application 214, and/or (3) social media service 212 to receive audio segments from third-party application 218. In these examples, third-party application 218 may pass audio segment 220 through the API, configured, provided, and/or maintained by social media service 212, enabling social media application 214 to call audio segment 220 (from third-party application 218) to add to a social media post (e.g., by adding audio segment 220 to a post creation interface, as will be described at steps 120-140).

Third-party application 218 may receive user 206's selection of audio segment 220 in a variety of ways. In some examples, an audio file interface, presented by third-party application 218 while audio file 222 is playing, may include an element (e.g., an export-to-social-media element). In response to user input selecting the element, third-party application 218 may present an audio-selection interface (e.g., audio-segment-selection interface 224) that enables user 206 to select an audio segment from audio file 222 (e.g., via a digital audio scrubber provided within the audio-selection interface). The audio-selection interface may include a share element that, when selected via user input, triggers third-party application 218 to share the audio segment selected by user 206 with social media application 214. In these examples, third-party application 218 may have presented the audio-selection interface in association with audio file 222 and user 206 may have (1) selected audio segment 220 via the audio-selection interface and (2) selected the share element. In response, third-party application 218 may have transmitted audio segment 222 to social media application 214 (e.g., via an API provided by social media application 214). In some examples, social media service 212 may have provided third-party application 218 with the audio-selection interface (e.g., by providing a variety of third-party audio application with the same audio-selection interface such that an end user is presented with a familiar audio-selection interface across a variety of third-party audio applications).

Figure 7:
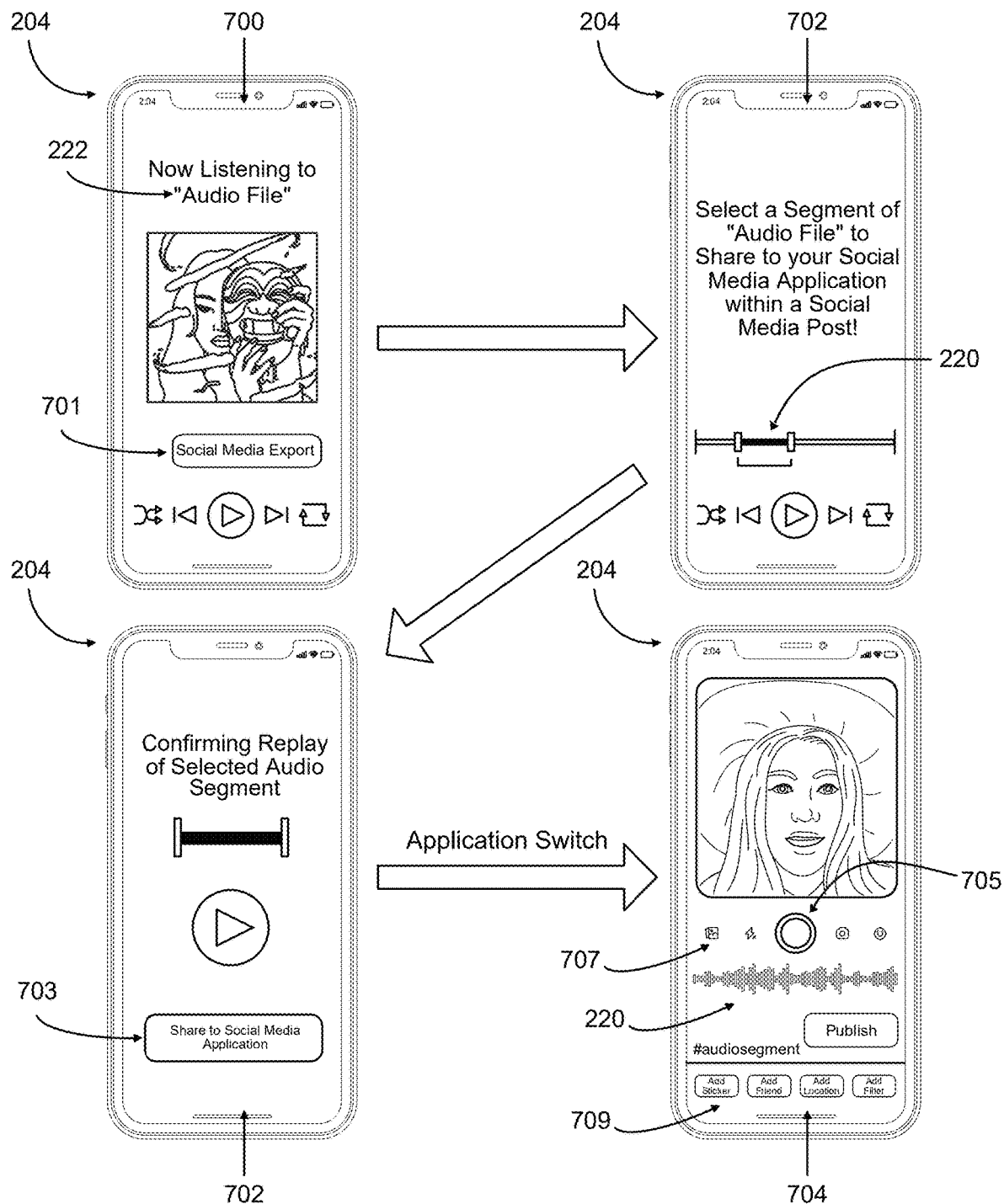
FIG. 7 is an illustration of an exemplary audio-selection-to-creation flow in which audio, selected via a third-party application, is shared to a social media application for use in a social media post creation flow.

FIG. 7 provides one exemplary illustration of an audio-selection process performed at third-party application 218

(e.g., using a framework and/or functionality provided to third-party application 218 by social media service 212). As shown in FIG. 7, third-party application 218 may be streaming audio file 222 via an audio consumption interface 700. Audio consumption interface 700 may include a social media export element 701. In response to receiving user input selection element 701, third-party application 218 may surface audio segment selection interface 702, which may enable user 206 select segment 220 of audio file 222. In response to receiving user input selecting a share-to-social-media element 703, third-party application 218 may share (e.g., transmit) audio segment 220 to social media application 214. In response to receiving audio segment 220, social media application 214 may present a post-creation interface 704, with audio segment 220 automatically included (as will be described in greater detail presently in connection with step 120).

Returning to FIG. 1, at step 120, one or more of the systems described herein may (e.g., in response to receiving the audio segment) (1) load the audio segment into a post-creation interface of a social media application installed on the user's device and (2) prompt the user to add visual content via the post-creation interface. For example, as illustrated in FIG. 2, audio module 216 may (1) load audio segment 220 into a post-creation interface 226 of social media application 214 and (2) prompt user 206 to add visual content via post-creation interface 226. In some examples, audio segment 220 may be passed from third-party application 218 to social media application 214 (e.g., via an API provided and/or maintained by social media service 212 and/or social media application 214) and loaded into post-creation interface 226 without audio segment 220 ever being downloaded to user device 204.

In some examples, audio module 216 may automatically (e.g., in response to user 206 selecting audio segment 222, in response to receiving audio segment 222, and/or as part of configuring post-creation interface 226) generate a digital attribution to audio segment 222, audio file 220, and/or third-party application 218. Additionally or alternatively, audio module 216 may automatically (e.g., in response to receiving audio segment 222 and/or as part of configuring post-creation interface 226) add the digital attribution to post-creation interface 226 (e.g., such that a resulting social media post will automatically include the digital attribution). In some examples, the digital attribution may include a link to audio segment 222, audio file 220, and/or third-party application 218. Additionally or alternatively, the digital attribution may include a text-based designation of audio segment 222, audio file 220, and/or third-party application 218 and/or a visual attribution (e.g., a logo). The digital attribution may be presented within a social media post created via post-creation interface 226 in a variety of ways (e.g., within a viewing pane of the post and/or within additional information provided in association with the viewing pane), as will be discussed in greater detail below in connection with step 130.

Media module 216 may prompt user 206 to add visual content to post-creation interface 226 in a variety of ways. In some examples, media module 216 may prompt user 206 to add a particular type of visual content. For example, media module 216 may prompt user 206 to add video content and/or digital images via post-creation interface 226. Additionally or alternatively, media module 216 may prompt user 206 to add visual content by providing functionality within prost-creation interface 226 that enables user 206 to add visual content. In some examples, post-creation interface 226 may include a functionality for capturing the visual content (e.g., a capture element that triggers a camera of user device 204 to capture a video and/or an image). Additionally or alternatively, post-creation interface 226 may include a functionality for uploading the visual content (e.g., from a camera storage database of user device 204) to post-creation interface 226.

FIG. 7 provides an exemplary illustration of a post-creation interface (i.e., interface 704). In this illustration, the post-creation creation interface automatically includes audio segment 220 and a digital attribution to audio file 222 (in the form of a selectable hashtag) and enables user 206 to (1) capture visual content (e.g., by providing a capture element 705), (2) upload visual content (e.g., by providing camera roll element 707), and/or (3) and add a variety of metadata (e.g., by providing metadata elements 709).

In some examples, the post-creation flow initiated by the audio share from third-party application 218 may be configured to include the audio (e.g., audio segment 220) from the audio share but to not include any platform-generated visual content (e.g., visual content generated by third-party application 218 and/or social media application 206) and/or to include the attribution to audio segment 220 as the only platform-generated visual content. In one such example, post-creation interface 226 may present as a blank visual canvas (e.g., with functionalities that enable user 206 to add visual content to the blank visual canvas). In these examples, by including audio from the audio share, without including any visual content, the disclosed system may focus on enriching user-generated visual (e.g., video) content with audio content selected from third-party applications and/or may encourage users to personalize their audio shares with their own visual content.

Returning to FIG. 1, at step 130, one or more of the systems described herein may create a social media post that includes (1) the audio segment and (2) the visual content added by the user via the post-creation interface. For example, as illustrated in FIG. 2, audio module 216 may create a social media post 228 that includes (1) audio segment 220 and (2) visual content 230 added by user 206 via post-creation interface 226.

In some examples, social media post 228 may additionally include a digital attribution (e.g., automatically created and/or automatically added to social media post 228, as described previously). In these examples, audio module 216 may add the digital attribution in a variety of ways. For example, audio module 216 may add the digital attribution to a viewing pane of social media post 228 (e.g., as a digital sticker placed over the user-generated visual content 230). Additionally or alternatively, audio module 216 may add the digital attribution to an area outside of the viewing pane (e.g., as a caption). In some examples, this attribution may represent and/or include a link (e.g., to a page of third-party application 218 corresponding to audio file 222 and/or to audio segment 220).

Returning to FIG. 1, at step 140, one or more of the systems described herein may (e.g., in response to receiving user posting input) post the social media post to a social media consumption channel (e.g., a consumption channel configured for an additional user). For example, as illustrated in FIG. 2, audio module 216 may post social media post 228 to a social media consumption channel 232 (e.g., a consumption channel configured for user 210).

Social media consumption channel 232 may represent any type or form of consumption channel that enables the consumption of digital social media. In some examples, social media consumption channel 232 may represent a status-broadcasting channel (e.g., a social media feed). FIG.

3 depicts an exemplary embodiment in which audio module 216 posts social media post 228 (newsfeed post 308 in FIG. 3) to a newsfeed. FIG. 4 depicts an exemplary embodiment in which audio module 216 posts social media post 228 (story post 402 in FIG. 4) to a story feed. FIG. 6 depicts an exemplary embodiment in which audio module 216 posts social media post 228 (short-form video post 602 in FIG. 6) as a short-form video in a short-form video feed. In some examples, social media consumption channel 232 may represent a messaging thread. FIG. 5 depicts an exemplary embodiment in which audio module 216 posts social media post 228 (messaging post 508 in FIG. 5) within a messaging thread.

As described above, in some examples, visual content 230 may represent video content. In these examples, the posted social media post 228 may be configured to play audio segment 220 as the video content is displayed. Additionally or alternatively, in examples in which visual content 230 comprises written text and/or one or more images, the posted social media post 228 may be configured to play audio segment 220 as the text and/or images are displayed.

In addition, or as an alternative, to loading audio segment 222 to a post-creation interface, in some examples, audio module 216 may be configured to, in response to receiving audio segment 222 (e.g., as described at step 110), add audio segment 222 to an artificial reality environment. In these examples, social media application 214 may represent an artificial reality application that enables users to create artificial reality environments. In one such example, the audio-segment selection interface described above in connection with step 110-120 may enable user 206 to select an audio segment (e.g., audio segment 220) to be added to an artificial reality environment creation flow provided via social media application 214. In this example, user 206 may access the resulting artificial reality environment for solo use and/or may invite other users (e.g., contacts of user 206) to join the resulting artificial reality environment.

User interfaces corresponding to the methods and systems described above may be surfaced as part of a variety of navigational flows (e.g., a variety of audio consumption flows and/or a variety of post creation flows). In some examples, a navigational flow may include a combination of user interfaces described herein and additional user interfaces not described herein. Each user interface described herein may be presented from a variety of entry points. In some examples, the user interfaces described here may be interconnected (e.g., with one interface navigating to another).

As described above, the present disclosure discloses a system for transferring audio segments across applications. In some examples, a social media platform may provide a third-party application (e.g., an audio consumption application) with an audio sharing capability.

The audio sharing capability may enable a user to select an audio segment from an audio file (e.g., an original audio and/or video source) provided by the third-party application (e.g., a podcast, an audiobook, and/or or a recorded interview) to share to the social networking platform through a sharing entry point (e.g., an audio-transfer API). Upon receiving the audio segment (e.g., via the sharing entry point), the social networking platform may splice the content into a user content (e.g., video) editing flow (e.g., in which the user creates original visual content to combine with the imported audio content). In additional or alternative examples, the social networking platform may bring the audio segment into a virtual reality creation flow.

EXAMPLE EMBODIMENTS

Example 1: A computer-implemented method may include (1) receiving, from a third-party application installed on a user's device, an audio segment of an audio file selected by the user via an audio-segment-selection interface presented by the third-party application in association with the audio file, (2) loading the audio segment into a post-creation interface of a social media application installed on the user's device and prompting the user to add visual content via the post-creation interface, (3) creating a social media post including (i) the audio segment and (ii) visual content added by the user via the post-creation interface, and (4) posting the social media post to a social media consumption channel.

Example 2: The computer-implemented method of example 1, where the method further includes providing the third-party application with an Application Programming Interface that enables (1) the user to select the audio segment and/or (2) the third-party application to share the audio segment with the social media application.

Example 3: The computer-implemented method of example 2, where receiving the audio segment from the third-party application includes receiving the audio segment via the Application Programming Interface.

Example 4: The computer-implemented method of examples 1-3, where the method further includes, in response to receiving the audio segment from the third-party application, adding, to the post-creation interface and/or the social media post created via the post-creation interface, a digital attribution to the audio segment, the audio file, and/or the third-party application.

Example 5: The computer-implemented method of example 4, where the digital attribution is and/or includes a link to at least one of the audio segment, the audio file, or the third-party application.

Example 6: The computer-implemented method of examples 1-5, where the audio file represents a podcast, an audio book, and/or a music composition.

Example 7: The computer-implemented method of examples 1-6, where the social media consumption channel represents a newsfeed, a stories feed, and/or a messaging thread.

Example 8: The computer-implemented method of examples 1-7, where (1) the visual content added via the post-creation interface comprises video content and (2) the posted social media post is configured to play the audio segment while displaying the video content.

Example 9: The computer-implemented method of examples 1-8, where the method further includes adding the audio segment to an artificial reality environment.

Example 10: A system for implementing the above-described method may include at least one physical processor and physical memory that includes computer-executable instructions that, when executed by the physical processor, cause the physical processor to (1) receive, from a third-party application installed on a user's device, an audio segment of an audio file selected by the user via an audio-segment-selection interface presented by the third-party application in association with the audio file, (2) load the audio segment into a post-creation interface of a social media application installed on the user's device and prompt the user to add visual content via the post-creation interface, (3) create a social media post includes (i) the audio segment and (ii) visual content added by the user via the post-creation interface, and (4) post the social media post to a social media consumption channel.

Example 11: The system of example 10, where the computer-executable instructions further cause the physical processor to provide the third-party application with an Application Programming Interface that enables (1) the user to select the audio segment and/or (2) the third-party application to share the audio segment with the social media application.

Example 12: The system of example 11, where receiving the audio segment from the third-party application includes receiving the audio segment via the Application Programming Interface.

Example 13: The system of examples 10-12, where the computer-executable instructions further cause the physical processor to, in response to receiving the audio segment from the third-party application, add, to the post-creation interface and/or the social media post created via the post-creation interface, a digital attribution to the audio segment, the audio file, and/or the third-party application.

Example 14: The system of example 13, where the digital attribution is and/or includes a link to at least one of the audio segment, the audio file, or the third-party application.

Example 15: The system of claims 10-15, where the audio file represents a podcast, an audio book, and/or a music composition.

Example 16: The system of claims 10-15, where the social media consumption channel represents a newsfeed, a stories feed, and/or a messaging thread.

Example 17: The system of claims 10-16, where the visual content added via the post-creation interface represents video content and the posted social media post is configured to play the audio segment while displaying the video content.

Example 18: The system of claims 10-17, where the computer-executable instructions further cause the physical processor to add the audio segment to an artificial reality environment.

Example 19: A non-transitory computer-readable medium may include one or more computer-readable instructions that, when executed by at least one processor of a computing device, cause the computing device to (1) receive, from a third-party application installed on a user's device, an audio segment of an audio file selected by the user via an audio-segment-selection interface presented by the third-party application in association with the audio file, (2) load the audio segment into a post-creation interface of a social media application installed on the user's device and prompt the user to add visual content via the post-creation interface, (3) create a social media post including (i) the audio segment and (ii) visual content added by the user via the post-creation interface, and (4) post the social media post to a social media consumption channel.

Example 20: The non-transitory computer-readable medium of claim 19, where the computer-readable instructions further cause the computing device to provide the third-party application with an Application Programming Interface that enables (1) the user to select the audio segment and/or (2) the third-party application to share the audio segment with the social media application.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory devices 234, 236, and 238 in FIG. 2) and at least one physical processor (e.g., physical processors 240, 242, and 244 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a podcast or audiobook application installed on a user's device, a selection of an audio segment of an audio file via an audio-segment-selection interface presented by the podcast or audiobook application;
   opening, based on the selection of the audio segment, a separate social media application installed on the user's device;
   loading the audio segment into a post-creation interface of the social media application and prompting the user to add visual content via the post-creation interface;
   creating a social media post comprising (1) the audio segment and (2) the visual content added by the user via the post-creation interface; and
   posting the social media post to a social media consumption channel via the social media application.

2. The computer-implemented method of claim 1, further comprising providing the podcast or audiobook application with an Application Programming Interface that enables at least one of (1) the user to select the audio segment or (2) the podcast or audiobook application to share the audio segment with the social media application.

3. The computer-implemented method of claim 2, wherein receiving the audio segment from the podcast or audiobook application comprises receiving the audio segment via the Application Programming Interface.

4. The computer-implemented method of claim 1, further comprising, in response to receiving the audio segment from the podcast or audiobook application, automatically adding, to at least one of the post-creation interface or the social media post created via the post-creation interface, a digital attribution to at least one of the audio segment, the audio file, or the podcast or audiobook application such that the social media post will automatically include the digital attribution.

5. The computer-implemented method of claim 4, wherein the digital attribution comprises a link to at least one of the audio segment, the audio file, or the podcast or audiobook application.

6. The computer-implemented method of claim 4, wherein the digital attribution comprises at least one of:
   a text-based designation of at least one of the audio segment, the audio file, or the podcast or audiobook application; or
   a visual attribution, an audio book; or
   a music composition.

7. The computer-implemented method of claim 4, wherein the digital attribution is presented within a viewing pane of the social media post.

8. The computer-implemented method of claim 7, wherein the digital attribution comprises a digital sticker.

9. The computer-implemented method of claim 1, further comprising adding the audio segment to an artificial reality environment.

10. A system comprising:
    at least one physical processor; and
    physical memory comprising computer-executable instructions that, when executed by the physical processor, cause the physical processor to:
        receive, from a podcast or audiobook application installed on a user's device, a selection of an audio segment of an audio file via an audio-segment-selection interface presented by the podcast or audiobook application;
        open, based on the selection of the audio segment, a separate social media application installed on the user's device;
        load the audio segment into a post-creation interface of the social media application and prompt the user to add visual content via the post-creation interface;
        create a social media post comprising (1) the audio segment and (2) the visual content added by the user via the post-creation interface; and
        post the social media post to a social media consumption channel via the social media application.

11. The system of claim 10, wherein the computer-executable instructions further cause the physical processor to provide the podcast or audiobook application with an Application Programming Interface that enables at least one of (1) the user to select the audio segment or (2) the podcast or audiobook application to share the audio segment with the social media application.

12. The system of claim 11, wherein receiving the audio segment from the podcast or audiobook application comprises receiving the audio segment via the Application Programming Interface.

13. The system of claim 10, wherein the computer-executable instructions further cause the physical processor to, in response to receiving the audio segment from the podcast or audiobook application, add, to at least one of the post-creation interface or the social media post created via the post-creation interface, a digital attribution to at least one of the audio segment, the audio file, or the podcast or audiobook application.

14. The system of claim 13, wherein the digital attribution comprises a link to at least one of the audio segment, the audio file, or the podcast or audiobook application.

15. The system of claim 10, wherein the audio file comprises at least one of:
    a podcast;
    an audio book; or
    a music composition.

16. The system of claim 10, wherein the social media consumption channel comprises at least one of:
    a newsfeed;
    a stories feed; or
    a messaging thread.

17. The system of claim 10, wherein:
the visual content added via the post-creation interface comprises video content; and
the posted social media post is configured to play the audio segment while displaying the video content.

18. The system of claim 10, wherein the computer-executable instructions further cause the physical processor to add the audio segment to an artificial reality environment.

19. A non-transitory computer-readable medium comprising one or more computer-readable instructions that, when executed by at least one processor of a computing device, cause the computing device to:
receive, from a podcast or audiobook application installed on a user's device, a selection of an audio segment of an audio file via an audio-segment-selection interface presented by the podcast or audiobook application;
open, based on the selection of the audio segment, a separate social media application installed on the user's device;
load the audio segment into a post-creation interface of the social media application and prompt the user to add visual content via the post-creation interface;
create a social media post comprising (1) the audio segment and (2) the visual content added by the user via the post-creation interface; and
post the social media post to a social media consumption channel via the social media application.

20. The non-transitory computer-readable medium of claim 19, wherein the computer-readable instructions further cause the computing device to provide the podcast or audiobook application with an Application Programming Interface that enables at least one of (1) the user to select the audio segment or (2) the podcast or audiobook application to share the audio segment with the social media application.

* * * * *